United States Patent
Lang et al.

(10) Patent No.: US 7,505,938 B2
(45) Date of Patent: Mar. 17, 2009

(54) INTERACTIVE VOICE RESPONSE QUICK CREDIT SYSTEM AND ASSOCIATED METHODS

(75) Inventors: Daniel J Lang, Columbus, OH (US); Ann K Rush, Gahanna, OH (US); Brian D Starner, Gahanna, OH (US)

(73) Assignee: Alliance Data Systems Corporation, Dallas, TX (US)

( * ) Notice: Subject to any disclaimer, the term of this patent is extended or adjusted under 35 U.S.C. 154(b) by 1138 days.

(21) Appl. No.: 10/176,167

(22) Filed: Jun. 20, 2002

(65) Prior Publication Data

US 2003/0236740 A1 Dec. 25, 2003

(51) Int. Cl.
G06Q 99/00 (2006.01)
(52) U.S. Cl. ............... 705/38; 705/35; 705/4; 370/229; 370/389
(58) Field of Classification Search ........... 705/35, 705/38; 235/380; G06F 157/00, 17/60
See application file for complete search history.

(56) References Cited

U.S. PATENT DOCUMENTS

| | | | | |
|---|---|---|---|---|
| 5,797,133 | A * | 8/1998 | Jones et al. | 705/38 |
| 5,870,721 | A * | 2/1999 | Norris | 705/38 |
| 6,014,645 | A * | 1/2000 | Cunningham | 705/38 |
| 6,088,686 | A * | 7/2000 | Walker et al. | 705/38 |
| 6,405,181 | B2 * | 6/2002 | Lent et al. | 705/38 |
| 6,587,841 | B1 * | 7/2003 | DeFrancesco et al. | 705/38 |
| 6,877,656 | B1 * | 4/2005 | Jaros et al. | 235/380 |
| 7,099,842 | B1 * | 8/2006 | Nault et al. | 705/38 |
| 2002/0103749 | A1 * | 8/2002 | Agudo et al. | 705/38 |
| 2002/0194118 | A1 * | 12/2002 | Nassar | 705/38 |
| 2003/0078877 | A1 * | 4/2003 | Beirne et al. | 705/38 |
| 2003/0126072 | A1 * | 7/2003 | Brock | 705/38 |
| 2003/0154162 | A1 * | 8/2003 | Danaher et al. | 705/38 |

OTHER PUBLICATIONS

Chapter 3 Online financial services, Jan. 2001, Plunkett's E-Commerce & Internet Business Almanac, p. 26.*
Hisey, P., "GE Tailors Card Programs for The Gap," *Card Magazine*, Nov. 2000, vol. 4, No. 10; p. 24.
American Banker-Bond Buyer, "Retail Cards: The Gap and Old Navy Debut High-Tech Private-Label Credit Cards," *Credit Card News*, Oct. 1, 2000, vol. 1, No. 19, p. 1, 3-pgs.
American Banker-Bond Buyer, "GE Tailors Card Programs for The Gap," *Card Marketing*, Nov. 2000, vol. 4, No. 10, p. 24, 2-pgs.

* cited by examiner

*Primary Examiner*—James P Trammell
*Assistant Examiner*—Behrang Badii
(74) *Attorney, Agent, or Firm*—Wong Cabello, LLP (57) ABSTRACT

A system and method for applying for a credit card, preferably at a point of sale, is disclosed. The system employs an automated interactive voice response system preferably sponsored by a credit card issuer. The user calls into the system using a standard telephone, and enters credit assessment information about the customer using the key pad of the telephone in response to verbal questions posed by the system. In one embodiment, only numeric information concerning the customer is entered, such as the customer's social security number. This credit assessment information is used to retrieve a credit report or score from a credit bureau database, which is used by the system to electronically decide whether to issue credit and to what extent and to establish a customer account. The system verbally provides information to the user regarding the credit assessment so that the customer's credit purchase can be quickly consummated.

7 Claims, 5 Drawing Sheets

INTERACTIVE VOICE RESPONSE QUICK CREDIT SYSTEM AND ASSOCIATED METHODS

FIELD OF THE INVENTION

The invention relates to credit card products and to systems and methods of providing such products. More particularly, the invention relates to systems and methods for quickly verifying a customer's credit and extending credit to that customer, and is particularly useful in the context of procuring credit at a point of sale.

BACKGROUND OF THE INVENTION

Credit card products (e.g., credit cards) are well known and have significantly changed the way in which financial transactions are conducted. Credit cards are typically offered and provided to customers through credit card issuers, such as retail corporations, banks, financial institutions, or other companies that administer "private label" credit cards on behalf of their mercantile clients (hereinafter, for convenience, "credit card companies"). With a credit card, a customer can purchase goods and services without an immediate and direct exchange of currency. As is well known, the total amount of funds available to the customer for making purchases is typically limited to a specific amount predetermined by the issuer of the card, typically referred to as the "credit limit" of the credit card.

The process of obtaining credit, more specifically a credit card, has been largely manual. Typically, an applicant fills out a credit application by hand, and then submits the application by mail. The customer is typically required to provide an assortment of information, such as social security number, address, income, phone number(s), other credit cards held, other loans or debts, etc. (hereinafter "credit assessment information"), which is then assessed by the credit issuer to decide whether, and to what extent (e.g., what credit limit), credit should be offered to the customer. An integral part of this assessment is the procurement and review of the customer's credit report or credit score as issued by a credit bureau such as EQUIFAX, TRANSUNION, or EXPERIAN, or other credit clearing houses (hereinafter "credit bureaus"). After such a review by the credit issuer, and if favorable, a credit card may then be mailed to the customer within some period of time, e.g., ten days.

The manual nature of the credit assessment of a particular customer, and issuance of credit to that customer, is especially problematic when a customer attempts to procure credit at a point-of-sale (POS). For instance, a customer may wish to purchase clothes at a store (e.g., VICTORIA'S SECRET), and may wish at that time to simultaneously procure a VICTORIA'S SECRET credit card to pay for the immediate and future purchases. This requires a sales clerk of the store to relate relevant credit assessment information concerning the customer to the credit card company that administers the store's credit card program (or other similarly functioning division within the store) to assess the customer's credit. This has been accomplished in a number of different ways. In one prior art technique, the sales clerk can call the store's credit card company, and verbally relate the credit assessment information about the customer by phone. (Using this technique, it may first be necessary for the customer to write down such information, e.g., on a form similar in nature to a standard mail-in credit card application.). The credit card company representative can then, perhaps off line from the store clerk, contact a credit bureau (either electronically or by phone) to pull up the customer's credit report or score. After assessment of this information, the credit card company representative could then reconnect with the sales clerk, or call the clerk back, and verbally relate necessary information about the credit request to the clerk. For example, the credit card company representative might verbally tell the store clerk that the credit has been approved, that the credit limit is $ X, and what the customer's new account number is. The sales clerk could then write that information down on a temporary paper credit card, usable with a customer's identification card, which will eventually be replaced by a true plastic credit card to be mailed to the customer's home address some days later. In the background, the credit card company representative performs the necessary steps to electronically open the customer's account, establish billing procedures, etc. This technique, however, is not beneficial to the establishment of customer credit, as it may take five to ten minutes to complete. This is generally an unsuitable length of time for the customer to be "waiting around" at the point of sale, as the customer would like to be in and out of the store with his purchase and credit card as quickly as possible. Moreover, this procedure takes up the time of the sales clerk, whose time would be better spent serving other customers who might be waiting in line with their purchases. "Faxing" the request and results by using such a technique might reduce this wait time to some extent, but not significantly so.

To reduce the length of time needed to run this credit assessment/issuance process at a point of sale, attempts have been made to further electronically automate the process. For example, in prior techniques, credit card companies have equipped their mercantile clients with certain hardware or software modifications to more quickly interface with the credit card company. In one embodiment of this modification, a store is equipped with a computing device capable of electronically interfacing with the credit card company. Such equipment might have a key pad by which credit assessment information about the customer can be entered, or might have a credit card "swipe" device capable of reading the magnetic stripe or an existing credit card or other card held by the customer to provide such information. Such a computing device can exist as a stand alone device, or may be incorporated into, or connected to, the point of sale terminal, likely requiring some modification to the software which runs the terminal. Thus, these prior art techniques require hardware and/or software modifications to be made at the point of sale, and therefore are expensive and not optimal.

More complicated solutions exist. For example, credit information can be procured from a credit bureau "on-line," e.g., through the internet, if the point of sale terminal is capable of connecting to the internet. But this removes the private label company from the loop, who cannot as part of the process, for example, electronically establish a customer account. Additionally, internet applications such as "screen scraping" and "web data mining" are usable by sales clerks to try and extract relevant credit assessment data for a given customer. (One such exemplary program is vTag™, marketed by Connotate Technologies). However, these technologies are difficult to run and interpret and prone to erroneous or complicated results requiring significant levels of assessment, thus defeating the goal of expediting the process.

These prior art methods for assessing and issuing credit are slow, frustrating, or expensive to implement. In view of the foregoing, there remains a need for an improved system and method for quickly providing credit while minimizing the risk to credit card issuers. It is envisioned that the present invention provides such a solution.

SUMMARY OF THE INVENTION

In one embodiment, a system and method of the present invention permits customers, preferably at a point of sale and through a sales clerk (user), to apply for a credit card, have that credit assessed, and open a credit card account. The system employs an automated interactive voice response (IVR) system preferably sponsored by the credit card issuer. The user calls into the system using a standard telephone, and enters credit assessment information about the customer using the key pad of the telephone in response to verbal questions posed by the system. In one embodiment, only numeric information concerning the customer is entered, such as the customer's social security number. This credit assessment information is passed by the IVR system to a credit bureau database to electronically retrieve a credit report or credit score for the customer. The IVR system uses this report or score to electronically decide whether to issue credit and to what extent, and to establish a customer account. The IVR system further verbally provides information to the user to allow regarding the credit assessment so that the customer's credit purchase can be quickly consummated. The system does not require modification to existing point of sales terminals, and can provide an assessment and approval of credit in a sufficiently quick time to function well at the point of sale.

DESCRIPTION OF THE FIGURES

The following figures form part of the present specification and are included to further demonstrate certain aspects of the present invention, in which.

DETAILED DESCRIPTION OF THE INVENTION

In the disclosure that follows, in the interest of clarity, not all features and details of actual implementations of a quick credit IVR system are necessarily described. It will of course be appreciated that in the development of any such actual implementation, as in any such project, numerous engineering and design decisions must be made to achieve the developer's specific goals and subgoals (e.g., compliance with mechanical and business-related constraints), which will vary from one implementation to another. Moreover, attention must necessarily be paid to proper engineering and design practices for the environment in question. However, while such a development effort for a quick credit IVR system might be complex and time-consuming, it would nevertheless be a routine undertaking for those of skill in the art having the benefit of this disclosure.

The present disclosure provides a system to allow a customer to apply for and receive credit in a rapid and efficient manner, or for a store clerk to do the same on behalf of a customer desiring credit. As used herein, "user" will refer to the person who engages the system, most likely the store clerk when the disclosed invention is used at a point of sale. In one embodiment, the system employs an interactive voice response (IVR) system accessible by a standard telephone. In an IVR system, as is well known, the user is voice prompted to enter certain relevant information in response to voice prompts, as will be herein described in further detail. Many such IVR systems are in existence and may be useable with this invention. For example, IBM's DirectTalk/6000 IVR system, SYNTELLECT Vista, INTERVOICEBRITE, Interactive Intelligence, or Edify's ELECTRONIC WORKFORCE are acceptable to implement the present disclosure.

Figure 1:
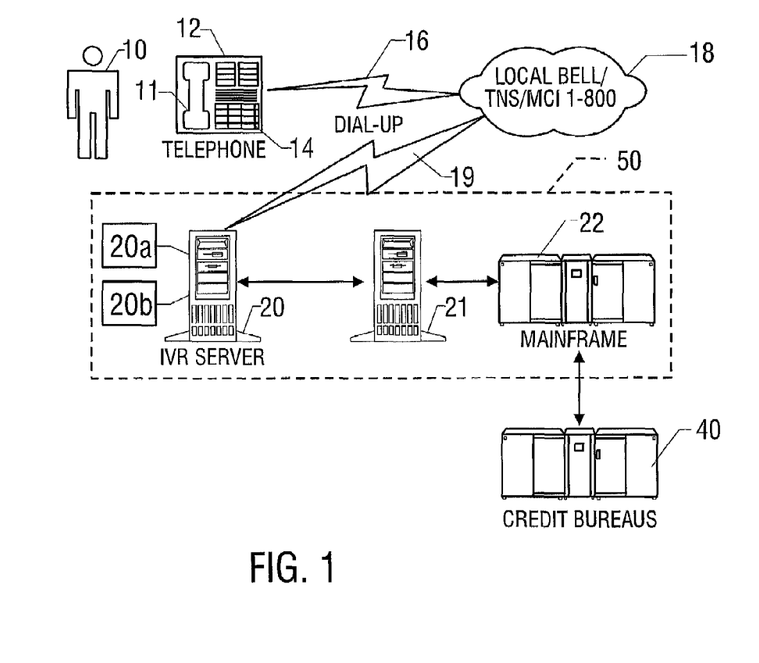
FIG. 1 illustrates the general system architecture of the present invention.

FIG. 1 illustrates the system architecture according to one exemplary implementation of an IVR quick credit system 50, which is a commercial embodiment would likely be run or sponsored by the credit card company which administers a given store's credit card program. Users 10 at the store access the IVR system 50 preferably through a standard telephone 12 having a handset 11 and alphanumeric push buttons 14. Alternatively, any functionally similar device having numeric input and audio capability, such as a computer, personal data assistance (PDA), or cell phone could be used.

Telephone 12 is connected by paths 16 and 19 to an IVR server 20. As is well understood in the communications arts, these paths will in a commercial embodiment pass through a switch 18 of a telephone carrier having well known features and functionalities that might be used to enhance the performance of the system. To establish the path to the IVR server 20, the user in a preferred embodiment calls the telephone number to which the server 20's modem or other communication device is connected, e.g., 1-800-CREDCHK. The paths 16 and 19 may include copper wires, optical cables, wireless links, or satellite, and may carry any number of analog or digital communication protocols as is well known in the art.

As noted, IVR server 20 ultimately receives the call from the user. To improve performance, automatic call distributors may be used in conjunction to perform call routing, holding, and/or leveling functions. As one skilled in the art will realize, server 20 may constitute a plurality of linked servers, allowing for system redundancy in case of a server failure. The server 20 may also contain a caller ID feature that may help the system assess which store is calling so that the call may be appropriately handled, or such that the appropriate IVR application can be run for that store. Additionally, different system phone numbers can be used to engage different functions of the system (e.g., credit assessment/issuance versus checking the status of a preexisting customer account).

Contained within the IVR server 20 are IVR application 20a and IVR application interface 20b. The IVR application 20a contains the program that the server runs. For example, in a credit assessment/issuance application, the IVR application would prompt the user to enter certain information about the customer or otherwise provide various user options accessible by the key pad of the telephone 12, as will be seen in more detail below. The interface 20b allows access by an IVR application programmer or administrator (by a computer or workstation; not shown) who can write or modify a given IVR application 20a. Additionally, the interface 20b interfaces with the other components of the system, including the user, as is well known in the computing arts. A System Network Architecture (SNA) server 21 facilitates communication with a mainframe 22 comprising a portion of the IVR system 50, preferably using an LU6.2 protocol, which is well known and not further described. Supplemental to the IVR system 50 is a credit bureau database 40, which again preferably communicates with the system 50 in accordance with the LU6.2 protocol. However, any well-known means to establish the necessary communication links within or to system 50 may be used in the context of the present disclosure. One skilled in the art will recognize that other communication components or communication protocols may be used to optimize systems communication, although these are not disclosed for clarity and so as not to obfuscate the invention.

Figures 4, 4A:
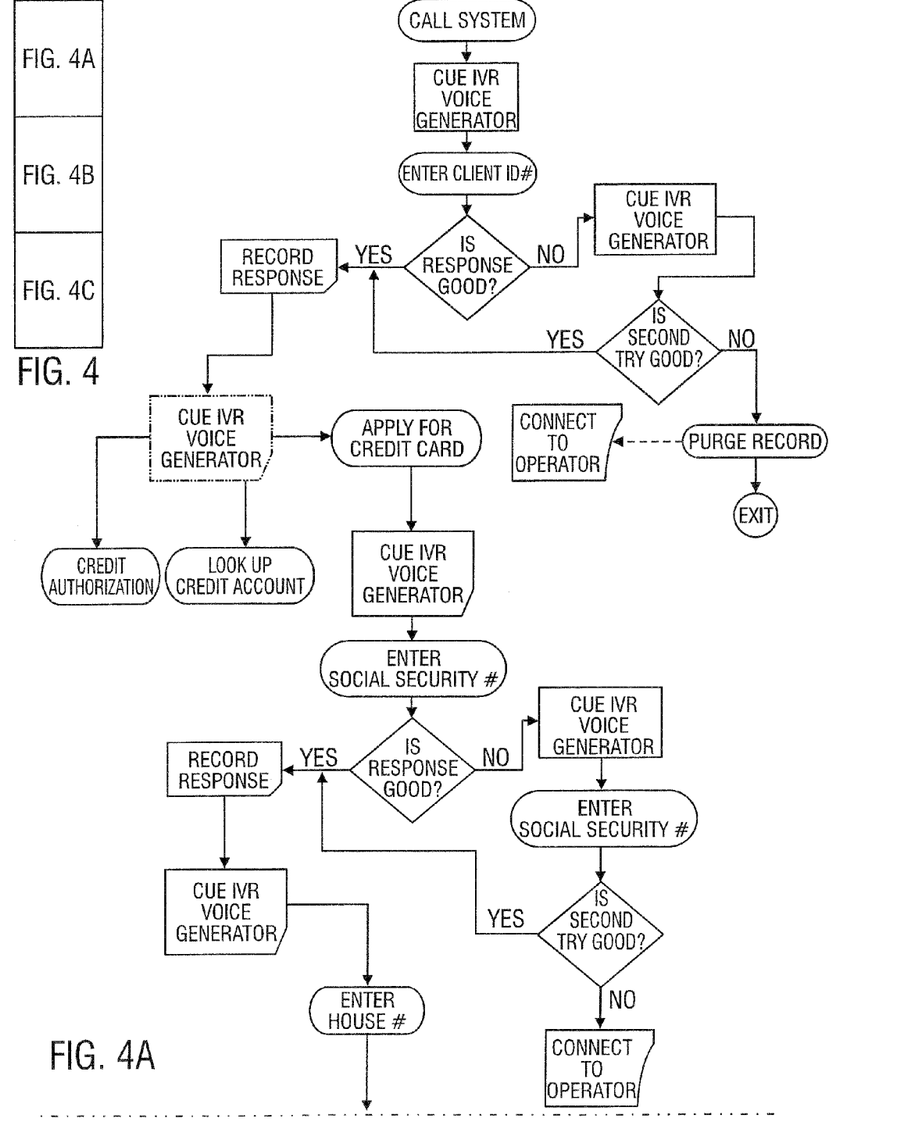
FIG. 4 illustrates further detailed flowchart of the process of requesting, assessing, and issuing credit using the disclosed system.

The mainframe 22 stores data pertinent to the system 50, and may include account information for the various stores (i.e., the system's clients), customer accounts, including amounts of available credit, credit limits, etc. (Further details concerning the mainframe 22, and related systems, are disclosed with respect to FIG. 4). As one skilled in the art will recognize, there may be more than one mainframe 22 residing in different locations. For example, a first mainframe governing west coast accounts could reside in Los Angeles while a second mainframe governing east cost accounts could reside in New York.

The credit bureau database(s) 40, such as those maintained by EQUIFAX, TRANSUNION, or EXPERIAN, maintain necessary credit information regarding the customers who might wish to establish credit through the use of IVR system 50. As is well known, database 40 should contain a file having information regarding a typical customer (unless that consumer has no pre-established credit record), such as the customer's social security (SS) number, his address including house number and zip code, his phone number, and other information relevant to an assessment of his credit, such as amount of outstanding debt, information about credit defaults, etc. Also preferably included within database 40 are computerized algorithms for determining a "credit score" or "credit rating" for the customer. For example, the database 40 can be programmed to assess the information in a given credit report and compute the well-known "Fair Issac" credit score, or FICO, or other credit score to quantify the credit worthiness of a given customer. Accordingly, and as occurs in the disclosed system, credit bureau database 40 may be queried by the system 50 to pull credit information about a given customer, and this information can then be used by the system mainframe 22 to make a determination as to whether credit should be extended to a given customer, and to what extent. The results of this determination can then be sent to the IVR server 20 for communication back to the user by IVR application 20a.

Figure 2:
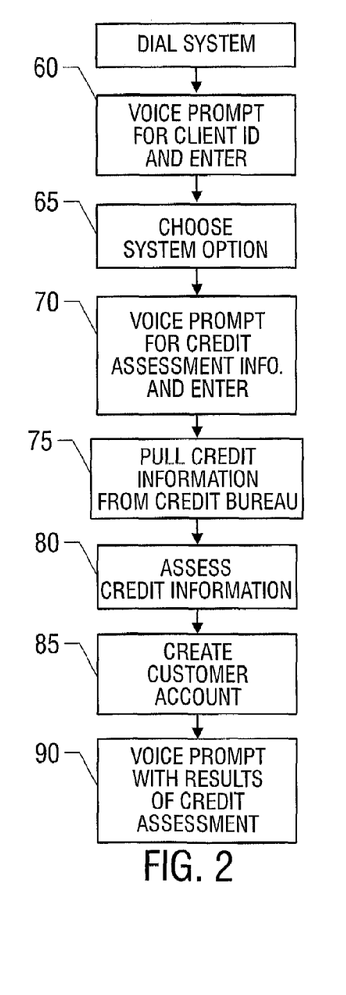
FIG. 2 illustrates a flow chart of the process of requesting, assessing, and issuing credit using the disclosed system.
Figure 4B:
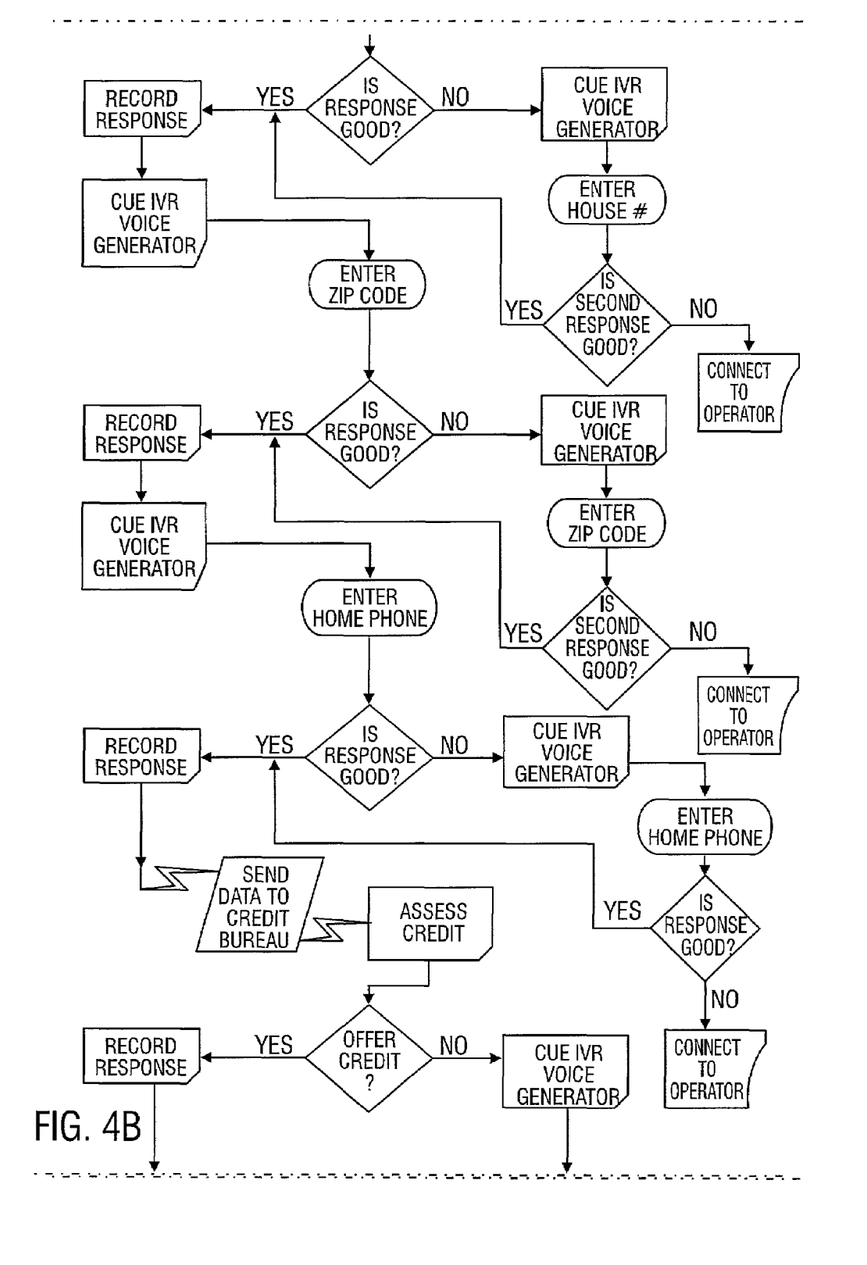
Figure 4C:
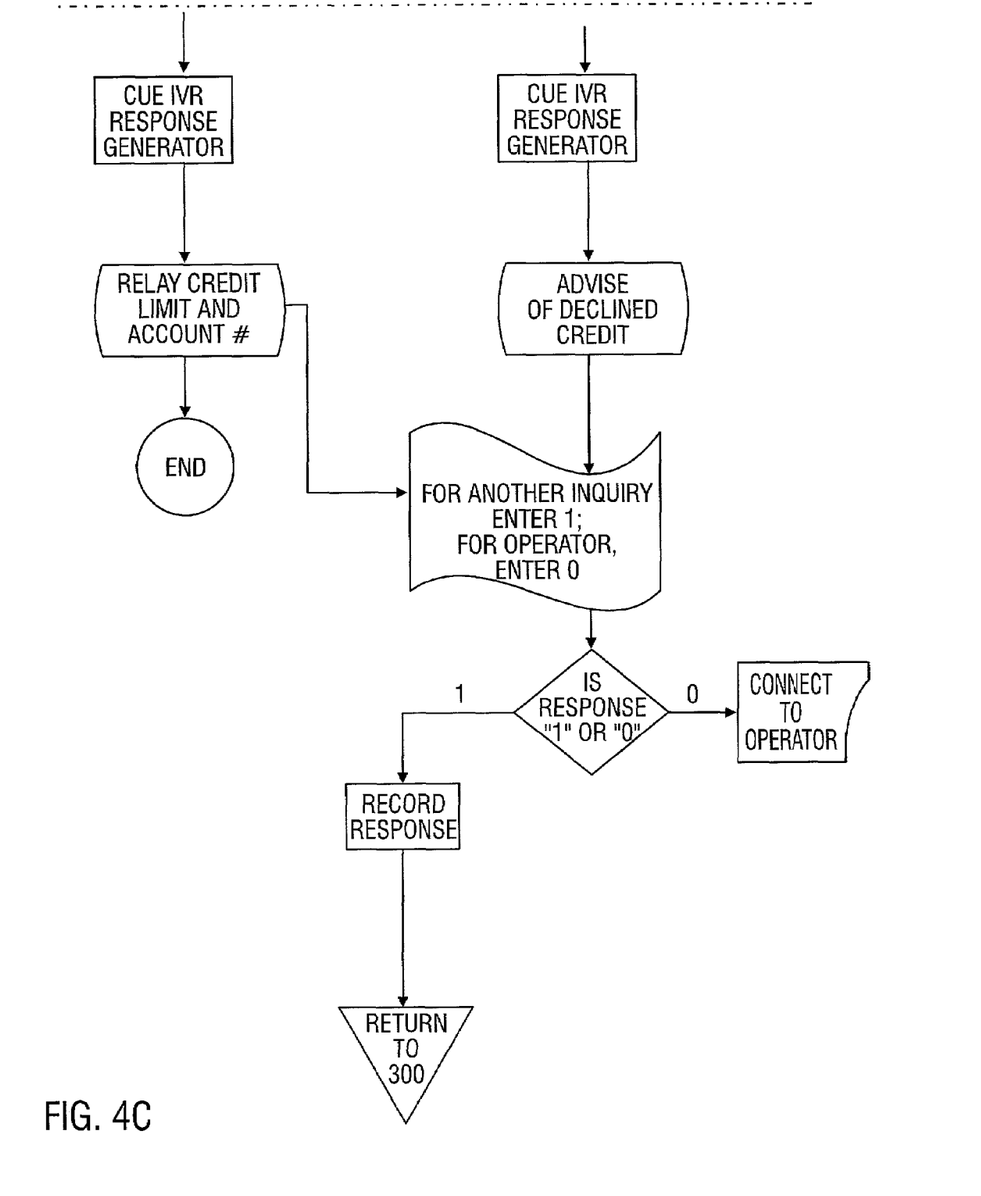

A flow chart to illustrate the basic functionality of the system 50 is shown in FIG. 2. Further specific details are disclosed in the flow charts of FIGS. 4A-4C. To illustrate this functionality, assume that a customer at a point of sale desires to procure a private label credit card, e.g., a VICTORIA'S SECRET card. As described before, the user (e.g., a store clerk) dials by telephone into the system 50 (e.g., 1-800-CREDCHK). The call, perhaps in conjunction with an automatic call distributor, connects with a specific IVR server 20. The IVR server 20 cooperates with the interface 20b and cues it to generate the verbal prompts heard by the user in conjunction with the application 20a of interest.

In step 60, the IVR server 20 first verbally prompts the user for certain information concerning the user or the store with which he is affiliated, e.g., a client identification (ID) number. More specifically, the voice generator in the interface is cued to put out the appropriate verbal prompt, such as "Thank you for calling credit card services. Please enter the four digit client ID number by pressing the buttons on your telephone," to which the user would respond by inputting the required number on the key pad 14 of the telephone 12. As with all verbal prompts in the IVR system, the user must respond within a certain amount of time, or the system will "time out" and the call will be disconnected. The client ID number designates a certain user account with the system, and may be used as a means for verifying that only authorized users are accessing the system 50. For example, the entered client ID number may be checked against certain user accounts stored in the mainframe 22, or perhaps on the IVR server 20, to ensure that the user is authorized. Additionally, the user might be prompted to enter a password or personal identification number (PIN) as a further security measure, or other number which might designate the specific user (store clerk) which is accessing the system. Such accessing information may be stored in the user's account on mainframe 22 to provide a record of the extent of user access to the system, or to bill the store for the amounts of time spent accessing the system.

Figure 3:
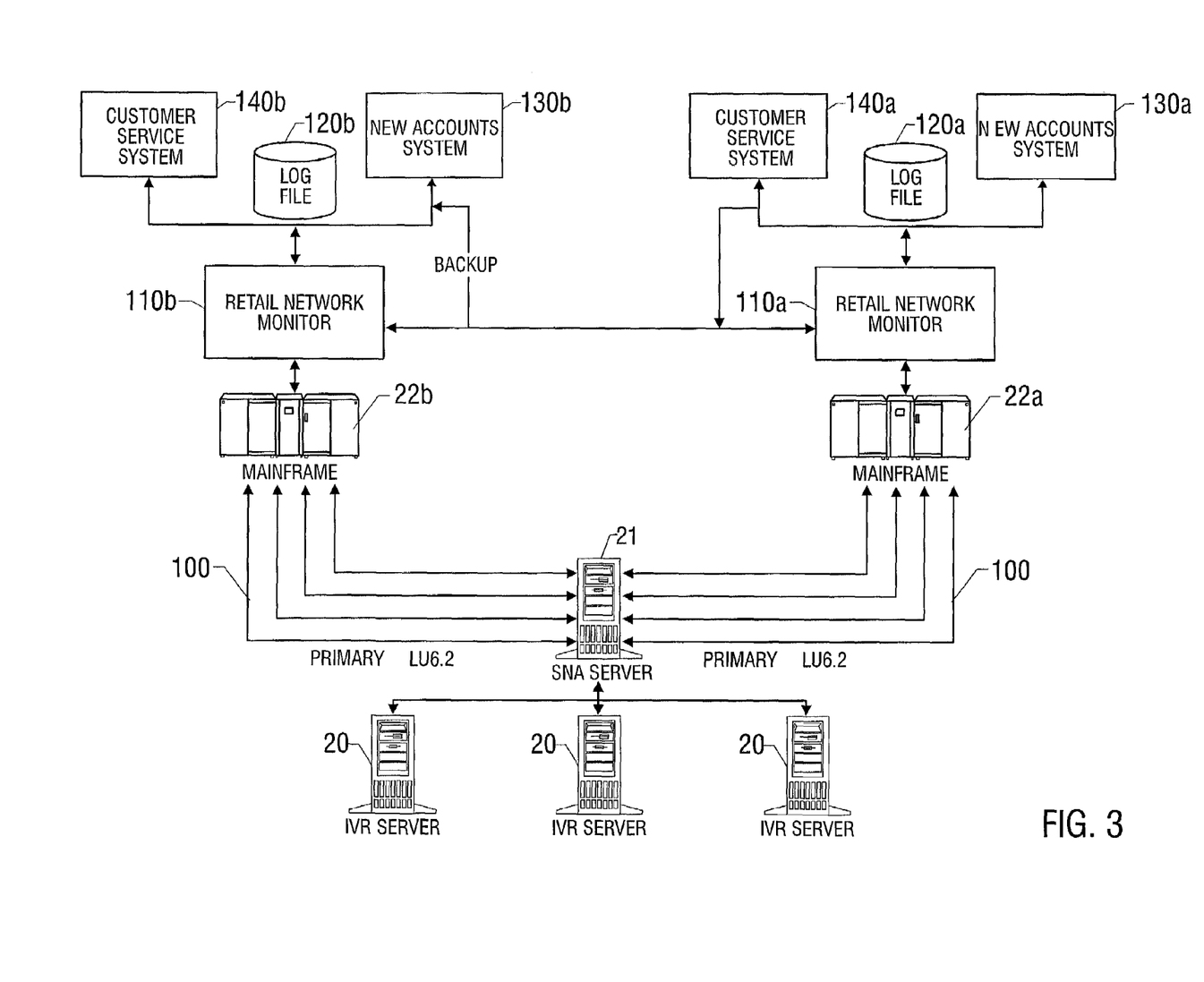
FIG. 3 illustrates further details of the system architecture.

When checking the validity of the client ID number (or perhaps its associated PIN), the inputted data is sent from the interface 20b to the mainframe 22 to query the user accounts to see if it (they) are valid. If proper, the mainframe sends back a "valid" signal to the interface 20b. If the client ID (or PIN) is not valid, the IVR application 20a is again cued and a verbal prompt explains to the user: "You have not entered a proper client ID number. Please re-enter your number." If the user is again unsuccessful, the system purges the record regarding the call (see log file 120; FIG. 3) or automatically connects the user to a systems customer service representative (see customer service system 140; FIG. 3). (Future voice prompts and associated responses are handled similarly by the system and these details are not further explained in the text of this disclosure, although certain of these details can be seen in FIGS. 4A-4C).

Once the user's client ID is accepted, the user is then (step 65) verbally prompted to choose any number of options offered by the IVR application 20a. (In this regard, it should be noted that the user's phone number, or his client ID number, can be used by the server 20 to select an appropriate application 20a to be run, thus providing the system flexibility to run different applications for different users.) For example, the server may prompt the user to "press 1 for sale authorization, press 2 for credit card account number information, or press 3 to establish a new credit card account." Alternatively, the options provided may be a function of and automated by the client ID, store clerk ID, password, PIN number, or other information provided earlier during step 60.

Exemplary options 1, 2, and 3, illustrated above are only illustrative and provide a sense of the functionality that the system can provide using the techniques and system disclosed herein. Thus, using the "sales authorization" option (1), the amount of existing credit in a preexisting consumer account can be monitored, or it can be determined whether the customer's account is in default. To perform this function, credit assessment information concerning the customer, or the customer's account if already established, could be provided by the user, as explained below. However, because the option of "establishing a new credit card account" is most complex and the primary problem that this disclosure addresses, this disclosure proceeds with a further description of this function.

Thereafter, the interface 20b initiates the voice generator to prompt the user to enter certain information regarding the customer (step 70), i.e., some form of credit assessment information. The type of credit assessment information regarding the customer is preferably numeric in character, and suitable to use to query the credit bureau database 40 to determine the creditworthiness of the customer. For example, the system may prompt the user to "enter the customer's social security number." To respond, the user may ask the customer to state his SS number so the user may punch it in, or the user may hand the customer the phone so he may do so himself. Or, the customer could write down this information prior to the user making the call to the system so that the user has the necessary information ready at the time it is prompted by the system. (It may be beneficial for security purposes for the user to verify the customer's social security number prior to entering that number into the system, e.g., by visually inspecting an ID card of the customer). Regardless, the SS number would then be input using the telephone 12's key pad 14. At this step, and depending on the level of security required by the system, certain checks could be made by the system to ensure validity of the SS number. For example, the SS number cannot consist of nine of the same digits (e.g., 111-11-1111).

It is presently preferred to use at least the customer's social security number as credit assessment information, because such numbers are unique to particular customers and can be used to query the credit bureau's database 40 to pull credit assessment information concerning the customer. However, in a modified embodiment, the IVR server 20 verbally prompts the user for additional customer identification information, such as the customer's house number (i.e., 234 if the customer lives at 234 Elm Lane), the customer's zip code (e.g., 77064, possibly with the additional +4 geographic descriptor, e.g., 77064-3567), or the customer's primary phone number (e.g., home phone number). Such additional information is procured and entered as described above with respect to the social security number. Such additional information may, like the social security number, be used to query the database to pull relevant credit information from the credit bureau database 40. Of course, it will be appreciated that because such additional information may not be unique (e.g., many potential customers will have the house number of "234"), the other pieces of additional information will need to be used to sort through the located customer records. For example, after records having house number "234" are located, those records could then again be queried to see which contain a zip code of "77064," and if a plurality of record still remain, then further queried to see which contain the phone number of interest. In this way, the numeric information should eventually locate a particular credit record for assessment. However, because this modification is somewhat less efficient, as it involves effectively several different queries to the credit bureau database, it is instead preferred to use this additional information to verify that the record procured using the social security number is correct and corresponds to the customer. For example, the social security number 123456789 is used to query the credit bureau database 40, which should retrieve a single credit record. After this record is located, the additional information (house number, zip code, and phone number) can be compared to the retrieved credit record to ensure that the record is correct.

Optionally, at step 70, the IVR system 50 may request and store additional numerical customer information beyond that described above. As compared to the customer's social security number, house number, zip code, etc., this additional information may not be used to try and identify the customer, but rather may constitute supplemental information useful in the credit assessment itself. For example, for relatively expensive purchases such as furniture and jewelry, the IVR server 20 may verbally prompt the user to "please provide the customer's annual income," "please enter the customer's birthdate," or "please enter amount of the proposed purchase." These pieces of information, perhaps in conjunction with the procured customer credit score (discussed below) can be useful in determine whether, and to what extent, to issue credit. For example, expensive purchases, a low income, or young age, may suggest that the issuance of credit would be riskier, and might suggest that credit should not be issued, or should be issued with terms to reflect the increased risk (e.g., a higher interest rate). Other types of customer information might be useful for the same purpose.

Regardless of the numeric customer information used, ultimately the credit assessment credit information is sent by the IVR server 20 to the credit bureau database 40 to pull the customer's credit report or credit score (step 75) as just explained. In a preferred embodiment, the credit bureau database 40 contains within it an algorithm to assess the data that resides in the customer's credit report to provide a credit score or some other numeric indicator about the creditworthiness of the customer. As mentioned previously, this may be a FICO score, whose computation is well known. This score assessment is preferably performed at the credit bureau database 40 and sent back to the mainframe 22 for analysis. Alternatively, the entire contents of the credit report are pulled back to the mainframe 22, and the credit score analysis performed there or elsewhere on system 50. The "decision" as to whether to extend credit to a customer, and to what extent, is then passed on to IVR server 20 for communication back to user 10.

At step 80, the returned credit information for the customer is assessed by the mainframe 22 so that the credit card issuer can make a decision whether to issue credit, and to what extent (e.g., what credit limit is appropriate). This process is automated within mainframe 22, preferably by the use of a simple computer algorithm. For example, if the credit score is below a certain threshold value, the decision not to offer credit may be made. If the credit score is above a certain threshold value, it may be decided to offer the credit card at the best rate and with a sensible maximum credit limit (e.g., $5,000.00). Credit scores in between these values might render a less favorable offer of credit, for example, at a good rate but with a lowered credit limit. Furthermore, additional information pulled from the credit report, if pulled from the credit bureau database 40, or additional information entered concerning the customer, could be used in conjunction with the credit score to assist in making the credit determination. For example, and as explained above with respect to step 70, the customer could additionally be asked certain information that might not reside in his credit report, such as his monthly salary, with a higher monthly salary being used to effectively increase the procured credit score, possibly resulting in a better credit offer.

After the terms of credit for the customer has been established, at step 85, a customer account can be created and stored on mainframe 22. As will be explained in more detail herein, the mainframe 22 assigns a customer account number for the customer and stores the same in the mainframe 22 or its associated system, along with other necessary information about the customer such as the relevant credit terms, the credit information procured from the credit bureau database 40, the results of the credit assessment, etc. If the credit report is pulled from the credit bureau database 40, the customer name, address, phone number, etc. can also be stored in the mainframe, adding further automation to the system and saving the customer the hassle of having to provide such information. Storing this information in the mainframe 22 is useful because such a database can also preferably act as the database for automatically billing the customer on a monthly basis. In this regard, one skilled in the art will appreciate that the mainframe 22 will probably have connections to other systems to log purchases that the customer subsequently makes on his credit card.

At step 90, the IVR server 20 again communicates with the user, who, during steps 75, 80, and 85, has probably been holding on line waiting for the results of the analysis. Of course, because the credit assessment process is fully automated, this process may only take several seconds, which is a convenient and not burdensome amount of time for the user (and the customer) to be put "on hold" by the system 50 during a point of sale transaction. At step 90, the IVR server 20 would verbally relate to the user the results of the analysis that has been performed, thereby acting as a conduit to provide information to the user 10. These results are preferably written down by the user on a temporary paper credit card which the customer can use temporarily with a photo ID card before he receives his plastic credit card in the mail some days later. The temporary card will preferably have contained on it the terms and conditions of the credit card such as the interest rate, penalties for late payment, etc. For example, the IVR server 20 would relate to the user that "credit has been declined," or that "credit has been approved; customer account number is 2673854; credit limit is $5,000." With this information, the point of sale transaction may now proceed on a credit basis. As the customer's account number has been established with the system 50 (step 85), the user may post the customer's initial purchase to the newly created account. This would preferably not be done using the IVR system 50, as it would require a credit card sale receipt having the customer's signature thereon, although perhaps the system could be modified to allow the first transaction to be consummated using the system 50.

FIG. 3 provides further details concerning a preferred embodiment of IVR system 50. In FIG. 3, it is seen that a commercial embodiment might employ a number of IVR servers 20, a number of SNA server(s) 21 running, preferably, the LU6.2 protocol, and a number of mainframes 22. Also included are retail network monitor(s) 110, which acts as the gateway application server; a customer service system(s) 140, which provides the user the opportunity to speak with a live systems representative if necessary; a new accounts system(s) 130, which generates new account numbers and confirmation numbers; and a log file(s) 120, which logs the progress of a pending transaction for later storage.

The IVR server 20 connects to the mainframe 22 and associated systems through a network 100, which as mentioned may be an LU6.2 network, Ethernet wide area network (EWAN), Local Area Network (LAN), or other suitable network. The retail network monitor 110 receives the information sent from the IVR server 20 through the SNA server 21, and selects the appropriate application that is referenced in the application field message sent from the IVR server 20. That is, the monitor 110 decides how the data collected from the IVR server 20 should be handled and processed. In all cases, a log file 120 is created for each transmitted data set. In the event that the system directs a user to speak with a customer service representative (see FIG. 4), the data and account information collected are transferred from the log file 120 to the customer service system 140 for further processing and for access by the customer service representative.

In the event that a positive response was returned from the credit bureau database 40 (not shown) and a new account is to be generated, the data is sent to the new accounts system 130 for processing as described above. More specifically, new accounts system 130 generates the new account number and confirmation number for the customer's account, and then ultimately sends this data to the IVR server 20 and to the user. The data identifiers for the IVR application and the user address (i.e., client ID number) remain intact so that the SNA server 21 knows where to return the response message. The application interface 20*b* translates the response into a format suitable for the IVR application 20*a*, and a response message is sent to the user conveying the customer's new account number and a confirmation number.

It is preferable that IVR system 50 have backup processing systems. Thus, in the event that data transmitted from mainframe 22*a* to customer service system 140*a* is blocked (e.g., because all customer service representatives are busy, the new account server is busy, etc.), the customer service system 140*a* will transfer the data to the backup customer service system 140*b*, back up log file 120*b*, and backup new account system 130*b*, or vice versa. Information processing and storage is as described above, except that the response data is sent back to the relevant IVR server 20 through the backup retail network monitor 110*b*, stored in mainframe 22*b*, and then ultimately communicated to the IVR server 20 in the same manner as before.

The above-noted features and other aspects and principles of the present disclosure may be implemented in any number of ways, using any number of differing computer components, communication protocols, or computer software programs, to achieve the benefits of a quick credit IVR system as disclosed herein.

For example, instead of pushing the buttons of the telephone 12 to provide numeric input to the system (e.g., the customer's social security number), the IVR system 50, more specifically the IVR server 20, could be fitted with voice recognition software, allowing the user to speak the necessary numeric inputs. Software, implementable on the IVR server 20, to add this capability to the system is well known and easily implemented, although it may be unnecessarily complicated or expensive for a given application.

While the disclosed system is believed particularly convenient in that it preferably called only for numerical inputs concerning the consumer, alpha-numeric information could also be handled and input as numbers. For example, instead of just entering the house number, the user could also enter the customer's street name using the letter associated with the numbers on a standard telephone (e.g., the number '2' represents 'A,' 'B,' and 'C,' '3' represents 'D,' 'E,' and 'F,' etc.). Thus, for example, "Elm" street could be entered into the system as "356." Of course, other alpha constructs will also correspond to this numeric input, but this additional information could be used as a "double check" to ensure that the proper credit information is pulled for the customer from the credit bureau database 40. Or, two alphanumeric strings could be used as the primary search terms in the database (e.g., customer name and street number), which might be sufficient in a given case to identify a unique credit record corresponding to the customer.

While the disclosed system is believed particularly useful for offering credit to customers at a point of sale, it could easily have utility out of this context. For example, the customers themselves could in certain instances use the system to open credit card accounts from the convenience of their homes, although they might have to wait for the card to be mailed to them before such credit can be utilized. In this application, the security measures disclosed herein, and possibly other well-known security measures, might need to be added to the system to ensure that such a system would not be subject to abuse, a risk which is somewhat allayed when a third party user (e.g., store clerk) can verify the identity of the customer. Also, while particularly useful in the issuance of credit cards, the disclosed system could be useful in the quick extension of other forms of credit as well.

In short, it is contemplated that various substitutions, alterations, and/or modifications, including but not limited to those design alternatives which might have been specifically noted in this disclosure, may be made to the disclosed embodiment without departing from the spirit and scope of the invention as defined in the appended claims.

What is claimed is:

1. An electronically automated credit processing method, comprising:

transmitting a first initial electronic voice prompt from a system to a telephone during a current transaction at a point of sale, the first initial electronic voice prompt requesting a client identification to be input by a system user;

receiving a first initial electronic response at the system from the telephone in response to the first initial electronic voice prompt;

permitting access to the system by electronically verifying the client identification in the first initial electronic response;

transmitting a second initial electronic voice prompt from the system to the telephone during the current transaction, the second initial electronic voice prompt requesting an indication that a customer wishes to establish a credit card account during the current transaction at the point of sale;

receiving a second initial electronic response at the system from the telephone in response to the second initial electronic voice prompt;

transmitting a first informational electronic voice prompt from the system to the telephone during the current transaction, the first informational electronic voice prompt requesting a first piece of strictly numeric, non-alphabetic information about the customer;

receiving a first set of numbers at the system from the telephone in response to the first informational electronic voice prompt, wherein the first set of numbers is the customer's social security number;

transmitting at least one second informational electronic voice prompt from the system to the telephone during the current transaction, the at least one second informational electronic voice prompt requesting at least one second piece of strictly numeric, non-alphabetic information about the customer;

receiving at least one second set of numbers at the system from the telephone in response to the at least one second electronic voice prompt, wherein the at least one second set of numbers is selected from the group consisting of the customer's house number, zip code, birth date, and phone number;

retrieving credit information for the customer by transmitting only the first set of numbers for the first piece of strictly numeric, non-alphabetic information about the customer from the system to a remote database during the current transaction;

verifying the retrieved credit information by using the at least one second set of numbers;

determining with the system during the current transaction at the point of sale whether to establish a credit card account for the customer by automatically assessing the retrieved and verified credit information;

receiving supplemental sets of numbers for strictly numeric, non-alphabetic information about the customer at the system to assist in determining whether to establish the credit card account for the customer, wherein the supplemental sets of numbers are selected from the group consisting of the customer's income, age, and the amount of a purchase;

establishing a credit card account at the system for the customer based on the determination; and completing the current transaction at the point of sale using information from the established credit card account.

2. The method of claim 1, further comprising transmitting an indication of the determining whether to establish the credit card account for the customer.

3. The method of claim 1, wherein the remote database is a credit bureau database.

4. The method of claim 1, wherein the credit information comprises a credit report.

5. The method of claim 1, wherein the credit information comprises a credit score.

6. The method of claim 1, wherein the system user is a store clerk.

7. The method of claim 1, further comprising, as a first step, having the system user dial into the system using the telephone.

* * * * *